Dec. 18, 1951  H. G. ISHERWOOD ET AL  2,578,886
MOTOR ADAPTER
Filed Sept. 22, 1948
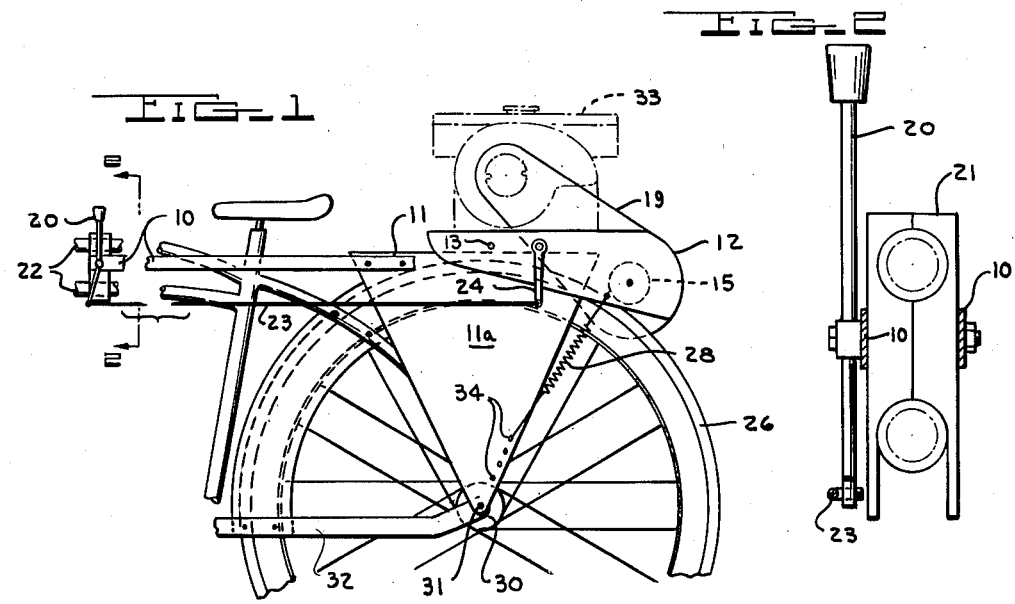
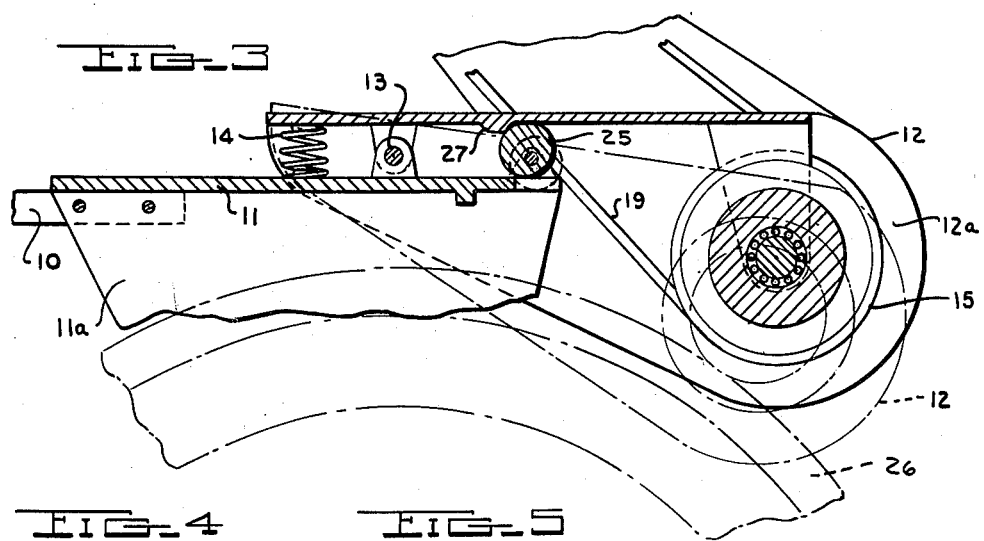
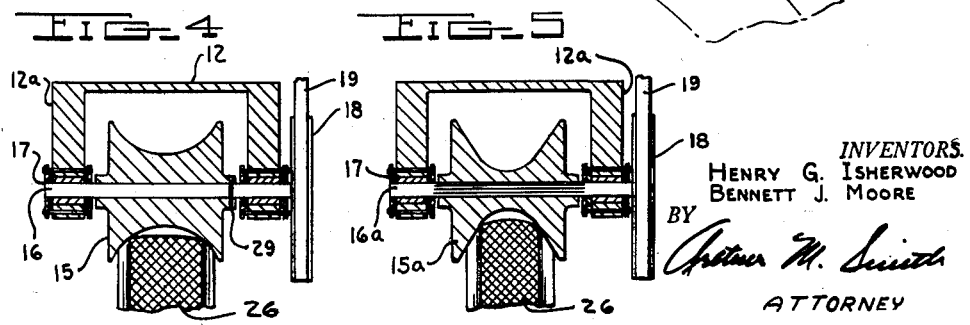
INVENTORS.
HENRY G. ISHERWOOD
BENNETT J. MOORE
BY
ATTORNEY Patented Dec. 18, 1951

2,578,886

UNITED STATES PATENT OFFICE 2,578,886

MOTOR ADAPTER

Henry G. Isherwood and Bennett J. Moore, Detroit, Mich., assignors to Buzz-Boy Motor Bike Co., St. Clair Shores, Mich., a limited copartnership Application September 22, 1948, Serial No. 50,484

6 Claims. (Cl. 180—33)

The present invention relates to improvements in an adaptor for mounting a motor on a bicycle or the like, and in particular to such an adaptor which includes means for transmitting power from the said motor to a wheel of such a vehicle.

Adaptors now in use and constructed for the same purpose as the present invention are difficult to install and require a considerable degree of mechanical skill for installation on conventional bicycle frames, as they frequently require a substantial reconstruction of the bicycle.

It is, therefore, a principal object of the present invention to provide a motor adaptor suitable for use on conventional bicycle frames, which is relatively simple to install without requiring a high degree of mechanical skill or any substantial alteration of the bicycle frame structure to do so.

It is a further object of the present invention to provide a motor adaptor suitable for use on conventional bicycle frames, which will permit the ready installation or removal of a conventional motor so that said motor may be used for other purposes such as running lawnmowers, air or water pumps, generators, or the like, when not in use on the bicycle.

It is a further object of the present invention to provide a motor adaptor suitable for use on conventional bicycle frames and having a power transfer device, which is so constructed as to accommodate run out of the driving wheel shaft due to such causes as power surges, and vibrations at certain shaft speeds, and which will also adapt itself automatically for driving a misaligned bicycle wheel.

Other objects of this invention will appear in the following description and appended claims, reference being had to the accompanying drawings forming a part of this specification wherein like reference characters designate corresponding parts in the several views.

In the drawings:

Fig. 1 is a fragmentary side elevation of the rear portion of a bicycle on which is mounted a motor adaptor of the present invention and showing the driving motor in phantom.

Fig. 2 is a rear elevation of the clutch lever and mounting bracket taken along the line 2—2 in the direction of the arrows, Fig. 1.

Fig. 3 is an enlarged side sectional view of the motor adaptor shown in Fig. 1 with various positions of the movable driving mechanism shown in phantom.

Fig. 4 is a sectional view showing one form of friction driving wheel and its mounting which may be used with the adaptor shown in Fig. 1, this form of driving wheel being constructed to provide a shallow grip on the bicycle tire.

Fig. 5 is a sectional view of another form of friction driving wheel and its mounting which may be used with the adaptor shown in Fig. 1, this form of driving wheel being constructed to provide a deep grip on the bicycle tire.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The motor adaptor of the present invention comprises an attaching bracket 10 formed of parallel, forwardly extending, spaced flat arms attached at their forward ends to the bracket 21 secured to the bicycle frame, and which are secured adjacent the top of the main supporting member 11 at their rearward ends. If desired, a suitable bracket may be employed to attach the supporting member 11 to the seat supporting frame bar. The member 11 is formed to take the place of a conventional rear luggage carrier and is flat across the top and has triangular sides 11a which extend downward and slope inward toward the hub portion 30 of the rear bicycle wheel to a point where the apices of the triangular sides 11a are detachably secured to the ends of the rear axle 31 which extend beyond the sides of the rear wheel fork 32 of the bicycle frame.

A carrier 12 is pivotally attached to the member 11 by the hinge 13 and is adapted to seat the motor 33. A compression spring 14 is interposed between the top of the member 11 and the carrier 12 forward of the hinge 13. A friction driving wheel 15 is mounted on a shaft 16 journaled in bearings 17 mounted in the bracket portion 12a of the carrier 12 rearward of the hinge 13 and near the end of the carrier 12. One end of the shaft 16 extends outwardly beyond the bearing 17 and is provided with a driven pulley 18 which is driven by the motor drive pulley (not shown) through a belt 19.

A control lever 20 is pivotally mounted on the bracket 21 which is secured to the parallel bars 22 of a bicycle frame. The bracket 21 has an open inverted U-shaped opening at the lower side thereof to accommodate differences in the spacings between the parallel bars of different bicycle frames. The lower end of the lever 20 is pivotally connected with a rod 23 which extends rearwardly therefrom toward the rear of the bicycle. The rear end of the rod 23 is pivotally connected to a lever 24 which is attached to a shaft on which an eccentric cam 25 is mounted.

The friction driving wheel 15 is normally held in contact with the bicycle tire 26 by the spring 14 except when the lever 20 is in a vertical position as indicated in Fig. 1, at which time the eccentric cam 25 has been rotated about its axis until it engages the cam stop 27 provided on the carrier 12 and has raised the carrier 12 to a position in which the drive wheel 15 is not in contact with the bicycle tire. Upon applying a pull against the handle or upper portion of the lever 20, the force is transmitted through the rod 23 and moves the lever 24 to rotate the cam 25 to the dotted line position shown in Fig. 3. This allows the spring 14 and the weight of the motor 33 to pivot the carrier 12 and to bring the drive wheel 15 into driving engagement with the bicycle tire 26, the operative position of the carrier 12 and drive wheel 15 being shown in phantom.

Thus a clutching mechanism is provided which enables the operator to disengage the friction driving wheel from the bicycle tire 26 when it is desired so to do. This construction also permits rotation of the cam 25 to any desired intermediate position which will vary the force of the driving connection between the friction wheel 15 and the shoulders of the tread of the tire 26. This is helpful in permitting controlled slippage between the friction wheel 15 and the tire 26 when engaging the motor 33.

A series of vertically spaced holes 34 may be located in the sides of the member 11 to accommodate one end of a coil spring 28. The other end of the coil spring 28 may be attached to the carrier 12. This construction affords an alternate or supplemental means for providing tension of the drive wheel 15 against the bicycle tire 26. The tension on the spring 28 may be adjusted by moving the end of the spring 28 to a higher or lower hole 34.

An important feature of the drive wheel 15 is that it is formed with a circular or parabolic depression extending around its periphery so that only the shoulders of the tread portion of the tire 26 are gripped as shown in Figs. 4 and 5. This feature reduces wear on the face of the tread of the tire, while providing a firm grip on the said tire. The action of the drive wheel 15 on the shoulders of the tire is similar to that of conventional V belt and V pulley drives. This construction operates satisfactorily at low pressures against the tire and effects an efficient driving connection with the tire.

An important problem in devices of the type herein disclosed is that the shaft and drive wheel will run out at certain rotational speed ranges which fall within the resonant frequency ranges. Also, very rapid acceleration will cause power surges to be transmitted to the driving wheel with resultant shock and vibration. Consequently, in order to prevent the transmission of the vibrations or oscillations of the wheel and shaft throughout the bicycle frame, provision has been made in the present invention to accommodate run out of both the shaft and the wheel.

One such provision is illustrated in Fig. 4 wherein the drive wheel 15 is mounted firmly to the shaft 16 by the pin 29. In this construction, the shaft is mounted comparatively loosely in the bearings 17 in order that the shaft and wheel may vibrate or oscillate. This construction also permits reciprocating lateral movement of the drive wheel 15 so that the tire 26 on a bicycle wheel which is slightly out of line may be tracked by the drive wheel 15.

Fig. 5 shows an alternate method of accommodating run out. In this construction, the shaft 16a is splined, and the inside of the centrally located hole in the wheel 15a is splined to fit the shaft 16a. These parts are so formed that the shaft is fitted rather loosely to the wheel to permit lateral movement of the wheel 15a relative to the shaft, and vibrations or oscillations of the shaft 16a and driving wheel 15a are thus readily accommodated. The splines allow the wheel 15a to move laterally on the shaft 16a while rotating and thus the wheel 15a will function properly on a tire 26 mounted on a bicycle wheel which may be slightly misaligned.

It can be seen from the drawings that the pivot 13 for the driving wheel carrier 12 is so located that the clockwise rotation of the bicycle wheel tends to pull the driving wheel 15 against the tire 26 on the said bicycle wheel. This is a very definite advantage inasmuch as the driving wheel 15 will not tend to disengage the bicycle tire when bumps are encountered by the bicycle wheel. Also, a firmer contact between the tire and driving wheel 15 is afforded by this construction.

The adaptor of the present invention may be readily installed on any existing bicycle by removing the luggage carrier, if one is provided on the bicycle, and mounting the member 11 thereon over the rear mud guard. The triangular sides 11a of the member 11 act as supplemental mud or splash guards when attached in position on the bicycle. A suitable opening is cut in the mud guard to accommodate the driving wheel 15 and the shaft mounting brackets 12a.

The motor 33 is so positioned on the pivotally mounted carrier member 12 that its weight is utilized to assist in causing the carrier 12 to pivot downwardly relative to the member 11 and bring the driving wheel 15 into driving engagement with the shoulders of the tread of the tire 26 when the cam 25 is rotated to permit the establishment of a driving connection.

Having thus described our invention, we claim:

1. A motor adaptor for mounting a motor on a bicycle frame and comprising a supporting member adapted to fit above the rear mud guard portion of a bicycle and which is flat on top and has triangular sides with apices extending to each end of the rear axle of a bicycle wheel for attachment thereto, a bracket for securing the top of said supporting member to the bicycle frame, a carrier member pivotally mounted near its forward end with said supporting member, a friction driving wheel grooved along its periphery for engagement with the shoulders of the tread of a bicycle tire and mounted at the rear of said carrier member and rearward of a vertical line extending through the center of the bicycle wheel, a spring interposed between the said supporting member and the forward end of said carrier member, and manually actuated means for engaging and disengaging said driving wheel and the bicycle tire.

2. A device as claimed in claim 1 and further characterized in that the manually actuated means for engaging and disengaging the friction driving wheel comprises an eccentric rotatable cam mounted between the said supporting member and the said carrier member, a control lever mounted by a bracket to the bicycle frame within easy access of the rider, and a connection between said control lever and said cam whereby actuation of said control lever will effect rotation of said cam to selectively raise or lower said carrier member relative to said supporting member.

3. A device as claimed in claim 1 and further characterized in that a coil spring is attached at one end near the rear of the carrier member and at the other end to one of a plurality of vertically spaced adjusting holes in one of the triangular side portions of the supporting member.

4. A device as claimed in claim 1 and further characterized in that the said friction driving wheel is pinned to a laterally movable axle shaft journaled in bearings mounted on the said carrier member which permit lateral movement of the shaft.

5. A motor adaptor which may be used to mount a motor on a bicycle frame, said adaptor comprising a supporting member adapted to fit over the rear wheel fork and mud guard of a bicycle frame, bracket means for securing said supporting member to the bicycle frame, a carrier member pivotally mounted on said supporting member near its forward end, a friction driving wheel mounted at the rear of said carrier member and disposed rearward of a vertical line extending through the center of a bicycle wheel for engagement with the rear bicycle tire, a spring interposed between the said motor supporting member and the forward end of said carrier member, and means for selectively engaging and disengaging the friction wheel with the said rear bicycle tire, and further characterized in that the means for engaging and disengaging the friction driving wheel comprises a rotatable eccentric cam mounted between said carrier member and said supporting member, a control lever mounted by a bracket to the bicycle frame within easy access of the rider, and a connection between said control lever and said cam whereby actuation of said control lever will effect rotation of said cam to selectively raise or lower said carrier relative to said supporting member.

6. A motor adaptor which may be used to mount a motor on a bicycle frame, said adaptor comprising a supporting member adapted to fit over the rear wheel fork and mud guard of a bicycle frame, bracket means for securing said supporting member to the bicycle frame, a carrier member pivotally mounted on said supporting member near its forward end, a friction driving wheel mounted at the rear of said carrier member and extending through the center of a bicycle wheel for engagement with the rear bicycle tire, said friction driving wheel being affixed to a laterally movable axle shaft for rotation therewith, said shaft being journaled in bearings mounted on the said carrier member which permit lateral movement of the shaft, a spring interposed between the said motor supporting member and the forward end of said carrier member, and means for selectively engaging and disengaging the friction wheel with the said rear bicycle tire.

HENRY G. ISHERWOOD.
BENNETT J. MOORE.

REFERENCES CITED

The following references are of record in the file of this patent:

UNITED STATES PATENTS

| Number | Name | Date |
| --- | --- | --- |
| 1,158,311 | Schunk | Oct. 26, 1915 |
| 1,578,525 | Ireland | Mar. 30, 1926 |
| 2,311,993 | Olsen | Feb. 23, 1943 |
| 2,519,749 | Edwards | Aug. 22, 1950 |

FOREIGN PATENTS

| Number | Country | Date |
| --- | --- | --- |
| 18,531 | Great Britain | 1897 |
| 81,869 | Austria | Dec. 10, 1920 |
| 115,004 | Great Britain | Apr. 25, 1918 |
| 180,327 | Great Britain | Oct. 26, 1922 |